Patented Oct. 6, 1936

2,056,924

UNITED STATES PATENT OFFICE 2,056,924

ZINC OXIDE DISPERSION

Wilfrid A. Kalber, Somerville, Mass., assignor to Dewey and Almy Chemical Company, North Cambridge, Mass., a corporation of Massachusetts No Drawing. Application December 30, 1932, Serial No. 649,602

13 Claims. (Cl. 134—78)

This invention relates to the dispersion of finely divided zinc oxide in an aqueous medium, and generally comprises the use of a dispersing agent of the general structure obtained by condensing an aromatic sulfonic acid, or a derivative thereof, with formaldehyde, or its equivalent, a process, and a product thereof, all as hereinafter more fully described and claimed.

It is frequently desired to employ finely divided zinc oxide for purposes which require its suspension or dispersion in an aqueous medium. Thus, for example, it is commonly added to rubber latex to provide a compounding and pigmenting agent for the rubber constituent thereof. In such cases it is desirable to have the zinc oxide as finely suspended in the aqueous medium as possible because in that form it possesses the greatest chemical reactivity and displays the least tendency to settle and form hard caked precipitates which are difficult to break up and redisperse. In more precise terminology the zinc oxide should be thoroughly peptized.

The dispersion of zinc oxide in aqueous media presents difficulties, however, and these difficulties have militated against its more general and otherwise advantageous use. If finely divided zinc oxide is stirred into water, the particles are not readily wet by the water and, once wetted, they tend to cling together, i. e. agglomerate, and do not disperse in the aqueous medium to produce colloidal particles of zinc oxide. These non-wetting and non-dispersing characteristics constitute serious disadvantages in the practical use of zinc oxide when suspended in aqueous media.

Attempts have been made to overcome the stated difficulties by adding protective colloids to the aqueous medium in which the zinc oxide was to be suspended. For this purpose there have been employed soaps, such as sodium stearate or oleate, and proteins, such as casein, hemoglobin, or albumen. But whereas these agents are generally very effective to disperse most finely divided pigments in water, zinc oxide presents unusual difficulties and is not particularly well dispersed by them. This is believed to be due to the fact that zinc oxide particles are very much smaller than, in fact of a different order of magnitude from that of, the particles of ordinary pigments and also to the fact that zinc oxide is chemically incompatible with many protective colloids and with colloidal dispersions generally. Thus, for examples, zinc oxide reacts with soaps such as sodium stearate or oleate to form insoluble substances, with proteins such as hemoglobin to produce transformation products, and with colloidal dispersions such as rubber latex to cause coagulation. Furthermore, the protective colloids formerly employed are in themselves attended with certain disadvantages. In order to be effective they must be used in relatively large quantities which are so great as to modify adversely the physical and chemical properties of the suspended zinc oxide itself.

An object of this invention is to provide a suspension of zinc oxide in an aqueous medium in which the zinc oxide is more completely dispersed and displays less tendency to settle and form hard caked precipitates than has heretofore been possible. Another object of the invention is to provide aqueous dispersions of zinc oxide of greater concentration and greater fluidity or plasticity at a given high concentration than has heretofore been attainable. Other objects and advantages of the invention will become apparent with its more detailed description.

I have discovered that the disadvantages of the prior art are overcome and the foregoing objects are attained if zinc oxide is dispersed in water containing dissolved therein a small quantity of one or more members of the class of aromatic compounds of the general structure obtained by condensing sulfonic acids of aromatic hydrocarbons or their derivatives with formaldehyde or its equivalent. These compounds may be looked upon as derivatives of polyaryl alkyls or their homologues and may be expressed by the general graphical formula $(A-R-A')SO_3M$ in which A and A' designate two or more aromatic groups—which may or may not be alike; which are joined to an aliphatic nucleus R which may consist of a single alkyl group or a plurality of alkyl groups associated in straight chain or branched chain formation; and in which $SO_3M$ designates at least one solubilizing group such as the free sulfonic acid group or a sulfonic acid group in combination with a soluble salt-forming radical. The members of the class may be synthesized either by direct sulfonation of a hydrocarbon or a derivative thereof which possesses the necessary configuration of at least two aromatic nuclei joined to an aliphatic nucleus, or, as is usually more convenient and commercially practical, by causing an aromatic sulfonic acid or a derivative thereof to react with formaldehyde or its equivalent, preferably in the ratio of approximately two mols of aromatic sulfonic acid for each mol. of aldehyde. The member of the family which I prefer to employ because it is cheap and very effective for present purposes may be obtained by condensing beta-naphthalene sulfonic acid with formaldehyde. While the beta-naphthalene sulfonic acid condensation product may be prepared in known ways, I find that the product obtained by following the procedure given below possesses highly satisfactory properties for use in practicing my invention.

To 100 parts of concentrated sulfuric acid (specific gravity 1.84) contained in a suitable sulfonator and maintained at 160° C. are added slowly with stirring 100 parts of refined naphthalene. After all of the naphthalene has been introduced (this operation generally requires about one hour), the mass is stirred at 160° C. for four hours longer or until a test shows that substantially none of the naphthalene remains unsulfonated. The sulfonation mixture is then cooled to about 100° C. and diluted with 44 parts of water to prevent solidification on subsequent cooling. The diluted material is further cooled to 80° C. at which temperature 12 parts of a 40% aqueous solution of formaldehyde are added. This mixture is then stirred for three hours longer at 80° C.; but at the end of each successive hour there are added 12 parts more of formaldehyde solution, making a total at the end of the three hours of four portions or 48 parts in all. After all the formaldehyde has been added, the temperature is progressively raised over a period of one hour to 95–100° C. where it is maintained for 18 hours while the mass is constantly stirred or until a control test shows that a product of optimum effectiveness has been obtained. Experience has shown that when pure naphthalene is used, a final heating period of 18 hours yields the best product. But when other compounds are substituted for naphthalene, as suggested below, or when different conditions prevail, a different heating period may be required to yield the optimum result; and this optimum heating period may be easily ascertained by means of the simple control test given later on in this specification for determining the minimum quantity of agent required to yield the optimum result. Soon after the temperature has been raised to 95–100° C., it is found that substantially none of the formaldehyde remains unconsumed in the condensation reaction. During the later stages of the 18-hour heating period, the mixture progressively thickens until at the end it generally reaches the consistency of thick molasses. If this thickening becomes so great, however, as to prevent proper stirring, a small quantity of water may be added to keep the material liquid. After the heating is completed, the mixture is cooled, neutralized with a suitable alkali, e. g. sodium hydroxide, and, if desired, dried. It is then ready for use.

The sulfonation of the naphthalene may be conducted in a cast iron vessel; but the reaction with formaldehyde is preferably carried out in enameled or lead-lined apparatus.

A somewhat purer and better product can be obtained by diluting the viscous reaction mass with about three times its volume of water (the amount is not important so long as it is sufficient to permit convenient handling in the subsequent filtering operation), and neutralizing with lime. For the latter purpose I generally use an aqueous paste or suspension of hydrated or slaked lime. The neutralized slurry is filtered hot to remove the calcium sulfate precipitate which forms from the interaction of the lime and sulfuric acid unconsumed in the sulfonation reaction; and to the filtrate is added the requisite amount of sodium carbonate quantitatively to convert the calcium salt of the desired sulfonic acid into its sodium salt. The resulting calcium carbonate precipitate may then be removed by filtration and the filtrate which contains the desired ingredient evaporated to dryness according to any of the well known drying procedures.

In place of naphthalene in the foregoing sulfonation and condensation procedure may be employed any homologue of naphthalene or any other aromatic hydrocarbon such as benzene, diphenyl, anthracene, phenanthrene, fluorene, etc., or any homologue or derivative thereof. When such substitutions are made, however, it is generally necessary to modify the sulfonation and condensation procedure; but these modifications, which vary with each compound, will be apparent to those skilled in the art. Products derived from the benzene series, however, are less effective than materials derived from polynuclear aromatic hydrocarbons or their derivatives. Alkylated aromatic compounds such, for example, as those afforded by the sulfonic acids of xylene, cumene, ethyl naphthalene, or retene generally lead to products which are more effective than similar but unsubstituted compounds. Thus the condensation product obtained from xylene sulfonic acid is more effective for present purposes than the one obtained from the simpler benzene derivative. But whereas condensation products prepared from alkylated compounds are especially desirable for use in the broader aspects of this invention, they may be objectionable for some purposes because, due to their tendency to reduce the surface tension of water, they promote the formation of foam in the zinc oxide dispersion. Materials made from aromatic compounds which are free from substituting alkyl groups have substantially no tendency to reduce the surface tension of water or to cause foam formation; and the products obtained by the reaction of naphthalene sulfonic acid with formaldehyde are specifically recommended for use in a preferred form of this invention where the tendency to produce foam is objectionable.

In the chemical reaction which occurs between an aromatic sulfonic acid and formaldehyde, it is my theory that the initial condensation reaction is followed by a progressive polymerization of the resulting condensed material, and that a certain optimum molecular weight is necessary to yield the best results for present purposes as determined according to the indicated empirical test given later on in this specification; but this theory forms no part of my definition and I do not desire to be bound by it.

Whereas I generally use the sulfonic acids of the herein defined class in the form of their sodium salts, any water-soluble salt or derivative, or even the free acid, may be employed. Salts of monovalent metals, particularly the alkali metals, are preferable, however, to salts of polyvalent metals.

In the practice of my invention aqueous dispersions of finely divided zinc oxide may be produced according to any of the general manipulative procedures formerly employed. The zinc oxide may be merely stirred into an aqueous solution of one or more of the herein described agents; but I prefer the procedure in which it is made into a paste with the solution of the dispersing agent or agents and the wet mixture ground in a ball or colloid mill, or any other suitable form of wet grinding or mixing device. It is sometimes desirable to combine the dispersing agent with finely divided zinc oxide in the dry state and then merely to stir the dry mixture into water. In that case also, my invention affords advantageous results. Such dry mixtures, however, do not yield, when stirred into water, suspended particles of zinc oxide existing in as finely divided condition as it is possible to obtain by intimate wet grinding or mixing procedures.

I have found that, in general, a quantity of dispersing agent equal to 2–5% of the weight of the zinc oxide to be dispersed yields very satisfactory results. The precise quantity adapted to yield the best results in any given instance depends on the prevailing conditions—in particular, on the concentration of the dispersion, the condition of the zinc oxide, and the member of the herein described class of dispersing agents which is chosen. It may be stated in general that 4% of material made according to the detailed directions given above will afford the best results; but the minimum quantity of any agent falling within my prescribed class required to yield the optimum dispersing effect under any given set of conditions may be easily ascertained by trial. For example, 60-gram portions of the zinc oxide to be used may be vigorously stirred into 40-cubic-centimeter portions of solutions containing, respectively, .6, 1.2, 2.4, 3.6, and 4.8 grams (1, 2, 4, 6, and 8%, respectively, of the weight of the zinc oxide to be dispersed) of the selected dispersing agent. The smallest quantity of agent essential to produce a paste having the maximum fluidity or least viscosity should be chosen: a larger quantity does no harm but is of no advantage. As previously stated, this test is also useful to ascertain and control the optimum degree of polymerization of products made according to the general procedure given above as well as to determine the relative value for present purposes of any material which falls within the scope of the appended claims.

Zinc oxide dispersions prepared in accordance with the present invention are more fluid or plastic than dispersions similarly prepared but with the aid of no or other dispersing agents known to me. In this connection it may be said that different zinc oxides dispersed in an aqueous medium give dispersions exhibiting widely different consistencies at any given concentration. The process of the present invention will always yield, however, so far as I am aware, a dispersion possessing greater fluidity or plasticity at any given concentration than can be obtained under like conditions with other dispersing agents. Dispersions of ordinary zinc oxide prepared in accordance with the present invention and containing as much as 50% by weight of dispersed material are quite fluid. Dispersions containing between 60 and 75% of zinc oxide are of more or less plastic or pasty consistency. It is possible with some zinc oxides to prepare in accordance with the present invention dispersions containing from 75–80% of dispersed material which are of a smooth, pasty consistency.

If a zinc oxide dispersion prepared in accordance with the present invention is diluted with water and examined under the microscope at a high magnification (900 diameters), minute particles will be observed suspended in the watery medium and engaging in rapid Brownian motion. In contradistinction to dispersions generally prepared with the aid of other dispersing agents, it will be found that the addition of small quantities of acids, or of salts providing heavy metal ions, to zinc oxide dispersions prepared according to the present invention will not markedly aggregate or flocculate the dispersed particles thereof. This fact makes the process of this invention particularly valuable for dispersing zinc oxide in acid environments or in the presence of heavy metal ions normally coagulative of colloidally dispersed material.

It should be understood that the present disclosure is for the purpose of illustration only and that this invention includes all modifications and equivalents which fall within the scope of the appended claims.

I claim:

1. The process of peptizing zinc oxide in an aqueous medium which comprises mixing zinc oxide and water in admixture with substantially 2–5% of a water soluble dispersing agent obtained by condensing formaldehyde with an aromatic sulfonic acid.

2. The process of peptizing zinc oxide in an aqueous medium which comprises mixing zinc oxide and water in admixture with substantially 2–5% of a water soluble dispersing agent obtained by condensing formaldehyde with an aromatic sulfonic acid which contains at least eight carbon atoms.

3. The process of peptizing zinc oxide in an aqueous medium which comprises mixing zinc oxide and water in admixture with substantially 2–5% of a water soluble dispersing agent obtained by condensing formaldehyde with a sulfonic acid of the naphthalene series.

4. The process of peptizing zinc oxide in an aqueous medium which comprises mixing zinc oxide and water in admixture with substantially 2–5% of a water soluble dispersing agent having a plurality of aromatic nuclei joined to an aliphatic nucleus.

5. The process of peptizing zinc oxide in an aqueous medium which comprises mixing zinc oxide and water in admixture with substantially 2–5% of a water soluble dispersing agent obtained by condensing formaldehyde with a polynuclear aromatic sulfonic acid.

6. The process of peptizing zinc oxide in an aqueous medium which comprises mixing zinc oxide and water in admixture with substantially 2–5% of a dispersing agent, said agent being a water soluble salt of a compound obtained by condensing substantially one mol. of formaldehyde with substantially two mols of beta-naphthalene sulfonic acid.

7. As a new composition of matter, a peptized aqueous dispersion of zinc oxide which contains substantially 2–5% of a water soluble compound obtained by condensing formaldehyde with an aromatic sulfonic acid.

8. As a new composition of matter, a peptized aqueous dispersion of zinc oxide which contains substantially 2–5% of a water soluble compound obtained by condensing formaldehyde with a sulfonic acid of the naphthalene series.

9. As a new composition of matter, a peptized aqueous dispersion of zinc oxide which contains substantially 2–5% of a water soluble compound having a plurality of aromatic nuclei joined to an aliphatic nucleus.

10. As a new composition of matter, a peptized aqueous dispersion of zinc oxide which contains substantially 2–5% of a water soluble compound obtained by condensing formaldehyde with a polynuclear aromatic sulfonic acid.

11. As a new composition of matter, a peptized aqueous dispersion of zinc oxide containing 2–5% of a water soluble compound obtained by condensing substantially one mol. of formaldehyde with substantially two mols of beta-naphthalene sulfonic acid.

12. As a new composition of matter, dry zinc oxide in intimate admixture with substantially 2-5% based on the weight of the dry zinc oxide of a water soluble dispersing agent obtained by condensing formaldehyde with an aromatic sulphonic acid.

13. As a new composition of matter, dry zinc oxide in intimate admixture with substantially 2-5% based on the weight of the dry zinc oxide of a water soluble dispersing agent having a plurality of aromatic nuclei joined to an aliphatic nucleus.

WILFRID A. KALBER.